United States Patent
Tang et al.

(10) Patent No.: US 8,912,752 B2
(45) Date of Patent: Dec. 16, 2014

(54) WIRELESS MOBILE COMMUNICATION DEVICE UTILIZING ANTENNA FOR POWER CHARGING AND WIRELESS CHARGING SYSTEM HAVING THE SAME

(75) Inventors: Chai-Lun Tang, Miaoli County (TW); Yu-Pin Chang, Taoyuan County (TW)

(73) Assignee: Auden Techno Corp., Taoyuan County (TW)

( * ) Notice: Subject to any disclaimer, the term of this patent is extended or adjusted under 35 U.S.C. 154(b) by 453 days.

(21) Appl. No.: 13/180,094

(22) Filed: Jul. 11, 2011

(65) Prior Publication Data

US 2013/0015811 A1 Jan. 17, 2013

(51) Int. Cl.
*H02J 7/00* (2006.01)
*H02J 7/02* (2006.01)

(52) U.S. Cl.
CPC ...................... *H02J 7/025* (2013.01)
USPC ........................................................ 320/108

(58) Field of Classification Search
USPC ........................................................ 320/108
See application file for complete search history.

(56) References Cited

U.S. PATENT DOCUMENTS

| | | | | |
|---|---|---|---|---|
| 5,600,225 | A | * | 2/1997 | Goto .............................. 320/108 |
| 2004/0257037 | A1 | * | 12/2004 | Hartung et al. ............... 320/114 |
| 2009/0033280 | A1 | * | 2/2009 | Choi et al. .................... 320/108 |

OTHER PUBLICATIONS

WO 2010/035177: Leijssen et al., Apr. 1, 2010.*

* cited by examiner

*Primary Examiner* — Samuel Berhanu
(74) *Attorney, Agent, or Firm* — Li & Cai Intellectual Property (USA) Office

(57) ABSTRACT

A wireless charging mobile communication device includes a wireless communication module, an electricity storage module, a converting module, an antenna module and a switching module. The antenna module receives and transmits wireless signal or electromagnetically induces a current. The switching module is electrically coupled to the antenna module, the wireless communication module, and the converting module. The switching module is for connecting the antenna module with the wireless communication module or connecting the antenna module with the converting module. The converting module is electrically coupled to the electricity storage module and converts the electromagnetically induced current for facilitating a charging of the electricity storage module. The converting module, the antenna module, and the switching module are integrated as an antenna device.

7 Claims, 4 Drawing Sheets

WIRELESS MOBILE COMMUNICATION DEVICE UTILIZING ANTENNA FOR POWER CHARGING AND WIRELESS CHARGING SYSTEM HAVING THE SAME

BACKGROUND OF THE INVENTION

1. Field of the Invention

The present invention relates to a wireless mobile communication device, and, more particularly, to a wireless mobile communication device which utilizes an antenna for electromagnetic induction for power charging, and a wireless charging system having the same.

2. Description of Related Art

Conventional wireless mobile communication devices are usually equipped with antennas and power charging ports for communication and power charging, respectively. The antennas, and the power charging ports, however, are configured to serve the aforementioned exclusive purposes. Additionally, the power charging ports of the conventional wireless communication devices are subject to wear and tear when they are in frequent use, failing to achieve the goal of extending the service of the wireless communication devices. Also, since the power charging ports are generally coupled to their corresponding adaptors before receiving power from power sources at the time of being charged the adaptors may become indispensible when the power charging is performed, somewhat causing inconvenience for frequent travelers who may have to carry the adaptors along with the wireless communication devices with themselves.

SUMMARY OF THE INVENTION

The object of the present invention is to provide a wireless charging mobile communication device, an antenna device integrated with charge capability, and a wireless charging system. The wireless charging mobile communication device according to embodiments of the present invention has two modes. In the first mode, the antenna module of the wireless charging mobile communication device is utilized for transmitting and receiving radio waves. In the second mode, the antenna module of the wireless charging mobile communication device is utilized for electromagnetically inducting a current so as to charge the secondary battery.

In order to achieve the aforementioned objects, according to an embodiment of the present invention, a wireless charging mobile communication device comprises a wireless communication module, an electricity storage module, a converting module, an antenna module and a switching module. The antenna module receives and transmits wireless signals or electromagnetically induces a current. The converting module is electrically coupled to the electricity storage module and converts the electromagnetically induced current to charge the electricity storage module. The switching module is electrically coupled with the antenna module, the wireless communication module, and the converting module. The switching module is used for connecting the antenna module with the wireless communication module or connecting the antenna module with the converting module.

In order to achieve the aforementioned objects, according to another one embodiment of the present invention, an antenna device integrated with charge capability is electrically coupled to an electricity storage module and a wireless communication module. The antenna device integrated with charge capability comprises an antenna module, a converting module, and a switching module. The antenna module is used for receiving and transmitting the wireless signals or electromagnetically inducting a current. The converting module is electrically coupled to the electricity storage module and converts the electromagnetically induced current to charge the electricity storage module. The switching module is electrically coupled with the antenna module, the converting module, and the wireless communication module. The switching module is used for connecting the antenna module with the wireless communication module or connecting the antenna module with the converting module.

In order to achieve the aforementioned objects, according to another one embodiment of the present invention, a wireless charging system comprises the aforementioned wireless charging mobile communication device and an electromagnetic induction device. The electromagnetic induction device comprises a containing vessel and an active coil. The containing vessel is used to contain the aforementioned wireless charging mobile communication device. The active coil is electrically coupled to local distribution networks and electromagnetically inducts with the antenna module of the wireless charging mobile communication device when the wireless charging mobile communication device is stored in the containing vessel.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

According to the embodiment of the present invention, a wireless charging mobile communication device may electromagnetically induce a current for facilitating a charging of an inner battery thereof In other words, an antenna module of the wireless charging mobile communication device of the present invention is utilized to receive and transmit wireless signals and to electromagnetically induce a current for the battery charging purpose.

Figure 1:
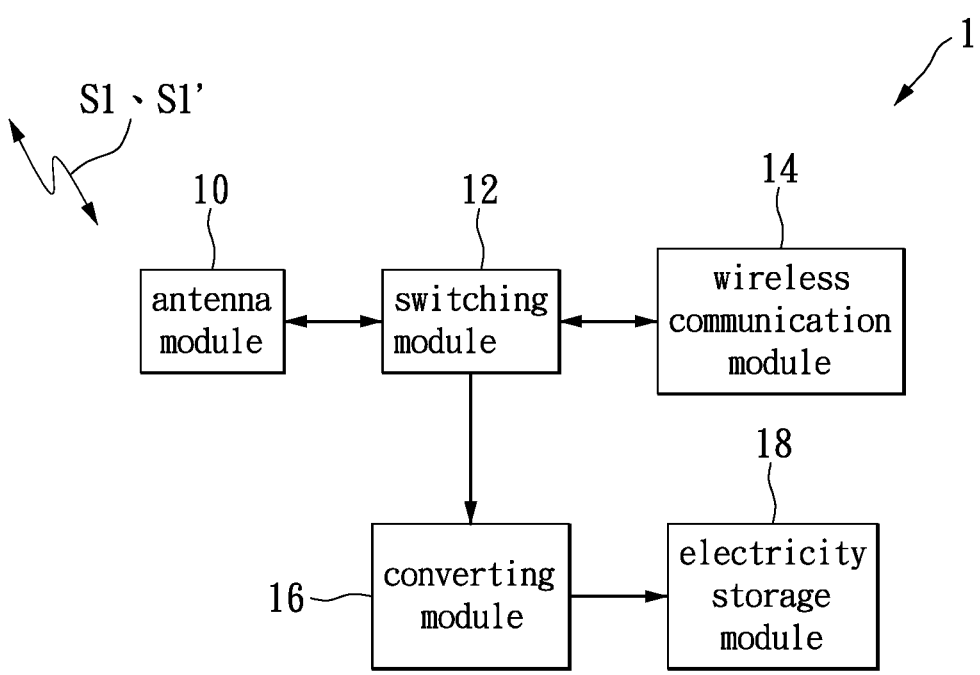
FIG. 1 shows a block diagram of a wireless charging mobile communication device according to an embodiment of the present invention.

Please refer to FIG. 1, FIG. 1 shows a block diagram of a wireless charging mobile communication device according to an embodiment of the present invention. A wireless charging mobile communication device 1 includes an antenna module 10, a switching module 12, a wireless communication module 14, a converting module 16, and an electricity storage module 18. The antenna module 10 is utilized to receive and transmit wireless signal S1 and S1', or to electromagnetically induce a current. The converting module 16 is electrically coupled to the electricity storage module 18 and converts the electromagnetically induced current so that the electricity storage module 18 may be charged. The switching module 12 is electrically coupled to the antenna 10, the wireless communication module 14, and the converting module 16. The switching module 12 is used for connecting the antenna module 10 with the wireless communication module 14 or connecting the antenna module 10 with the converting module 16.

The antenna module 10, the switching module 12, and the converting module 16 may be integrated to an antenna device, so that the antenna device may be capable of being charged when integrated with the wireless charging mobile communication device 1 by electrically coupling to the wireless communication module 14 and the electricity storage module 18.

The switching module 12 may switch between a first mode and a second mode. When the switching mode is switched to the first mode, the antenna module 10 may be coupled to the wireless communication module 14 through the switching module 12. At the same time, the wireless communication module 14 may process the wireless signal S1 which is received by the antenna module from a remote location and transmit a reply signal S1' to the antenna module 10, which in turn transmits the reply signal S1' to the remote location.

Besides, when the switching module 12 is switched to the second mode, the antenna module 10 is connected to the converting module 16. At the same time, the antenna module 10 is utilized to electromagnetically coupled to an outside electromagnetic induction device for electromagnetically inducing a current. Then, the converting module 16 connected to the antenna module 10 converts the electromagnetically induced current and transmits the electromagnetically induced current to the electricity module 18 for facilitating the charging of the electricity module 18.

As mentioned above, the antenna module 10 of the wireless charging mobile communication device 1 may be utilized to transmit and receive the wireless signals S1 and S1' and to electromagnetically induce a current. As such, the wireless charging mobile communication device 1 may both process the wireless signals and charge the electricity storage module 18 through the antenna module 10.

The electricity storage module 18 of the wireless charging mobile communication device 1 may be a secondary battery module. In one implementation, the secondary battery module comprises a lead-acid battery, or a nickel-cadmium battery, or a nickel-metal-hydride battery, or a lithium-ion battery, or a lithium-iron battery or combinations of the above. The switching module 12 of the wireless charging mobile communication device 1, meanwhile, may be a mechanical switch, such as a DIP switch, or a push button.

Figure 2:
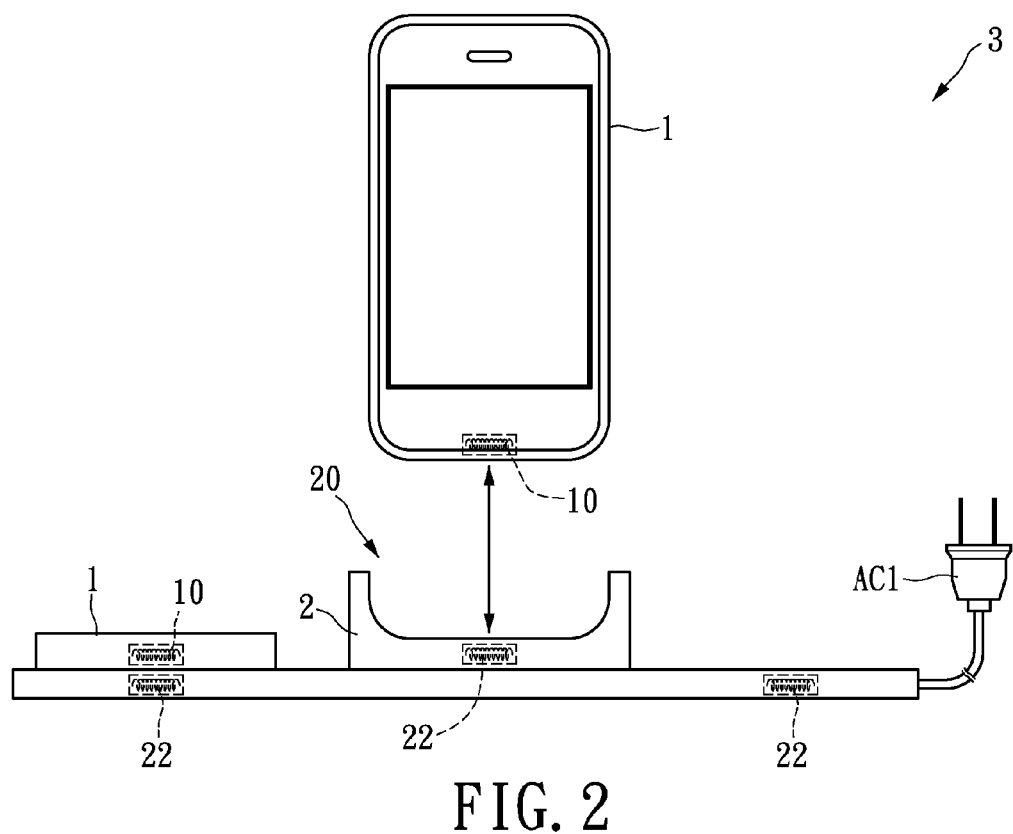
FIG. 2 shows a schematic diagram of a wireless charging system according to an embodiment of the present invention.

In conjunction with FIG. 1, please also refer to FIG. 2, which shows a schematic diagram of a wireless charging system according to an embodiment of the present invention. A wireless charging system 3 includes the wireless charging mobile communication device 1 and an electromagnetic induction device 2. The wireless charging mobile communication device 1 may be placed within a containing vessel 20 of the electromagnetic induction device 2 during the charging of the electricity storage module. The wireless charging mobile communication device 1 may rest on a top surface of the electromagnetic induction device 2. When the wireless charging mobile communication device 1 is placed within the containing vessel 20 or rests on the top surface of the electromagnetic induction device 2, the antenna module 10 of the wireless charging mobile communication device 1 may correspond to or align with an active coil 22 of the electromagnetic induction device 2. And under this arrangement the antenna module 10 and the active coil 22 may be electromagnetically coupled.

The active coil 22 may be coupled to a plug AC1 which is electrically coupled to local distribution networks. The active coil 22 receives an electrical power from the plug AC1 and electromagnetically inducts with the antenna module 10 for the antenna module 10 to generate a current for the charging purpose. As such, the wireless charging mobile communication device 1 may be charged without being in contact with a power source.

Figure 3:
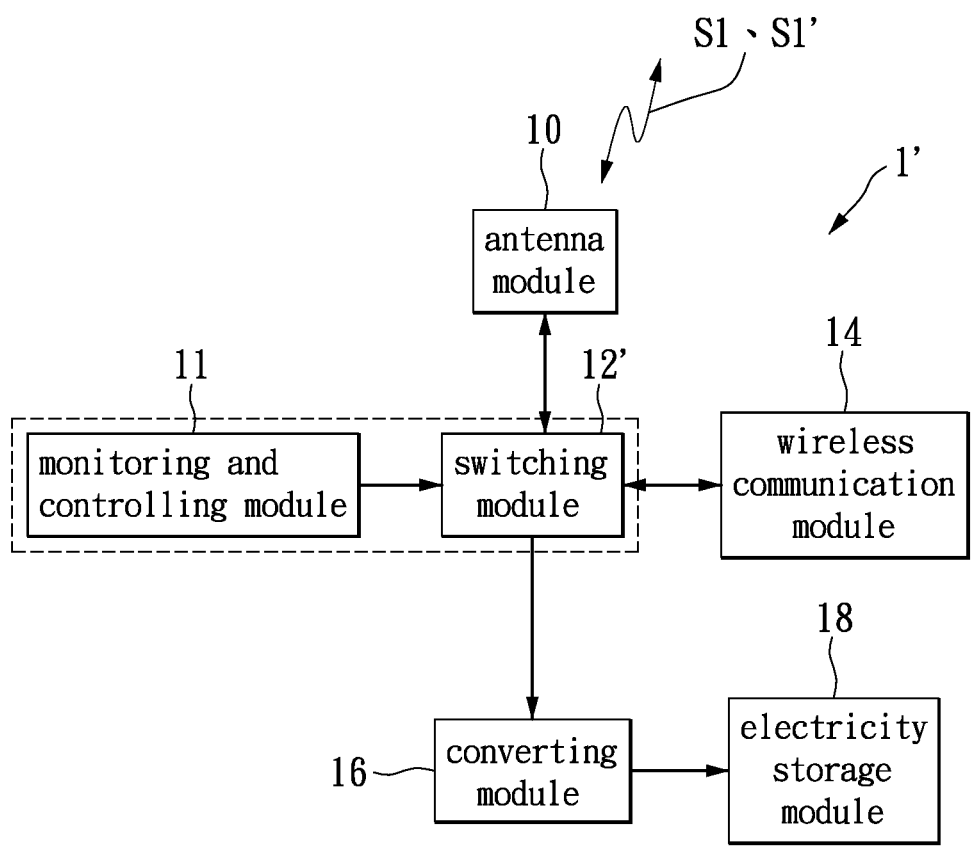
FIG. 3 shows a block diagram of a wireless charging mobile communication device according to another one embodiment of the present invention.

In conjunction with FIGS. 1 to 2, FIG. 3 shows a block diagram of a wireless charging mobile communication device according to another one embodiment of the present invention. A wireless charging mobile communication device 1' of the wireless charging system 3 further includes a monitoring and controlling module 11. The monitoring and controlling module 11 is electrically coupled to the switching module 12'. The monitoring and controlling module is used to detect whether or not the wireless charging mobile communication device 1' is stored in the containing vessel 20 of the electromagnetic induction device 2 and controls the switching module 12' according to detecting the placement of the wireless charging mobile communication device 1'.

More specifically, when the monitoring and controlling module 11 detects that the wireless charging mobile communication device 1' is not stored in the containing vessel 20, the monitoring and controlling module 11 controls the switching module 12' to switch to the first mode in which the wireless communication module 14 is configured to process the wireless signal S1 received by the antenna module 10 from a remote location and to transmit the reply signal S1' to the antenna module 10. Accordingly, the replied wireless signal S1' may be transmitted to the remote location through the antenna module.

Besides, when the monitoring and controlling module 11 detects that the wireless charging mobile communication device 1' is stored in the containing vessel 20, the monitoring and controlling module 11 controls the switching module 12' to switch to the second mode in which the antenna module 10 and the active coil 22 of the electromagnetic induction device 2 are electromagnetically coupled for generating a current for the charging purpose of the electricity storage module 18.

Therefore, the wireless charging mobile communication device 1' may automatically switch between the first mode and the second mode according to detecting whether the wireless charging mobile communication device 1' is accommodated within the containing vessel. In other words, the wireless charging mobile communication device 1' may either process the wireless signals or charge the electricity storage module 18 through the antenna module 10 according to whether the placement thereof is within the containing vessel.

The monitoring and controlling module 11 may be an infrared ray monitoring and controlling module or a monitoring and controlling and switching module. However, the monitoring and controlling module 11 is not restricted thereto. The mentioned switching module 12' may be an electronic switch, such as a magnetic switch, a proximity switch, a transistor switch. The switching module 12' may be controlled by the monitoring and controlling module 11 for switching between the first mode and the second mode.

Figure 4:
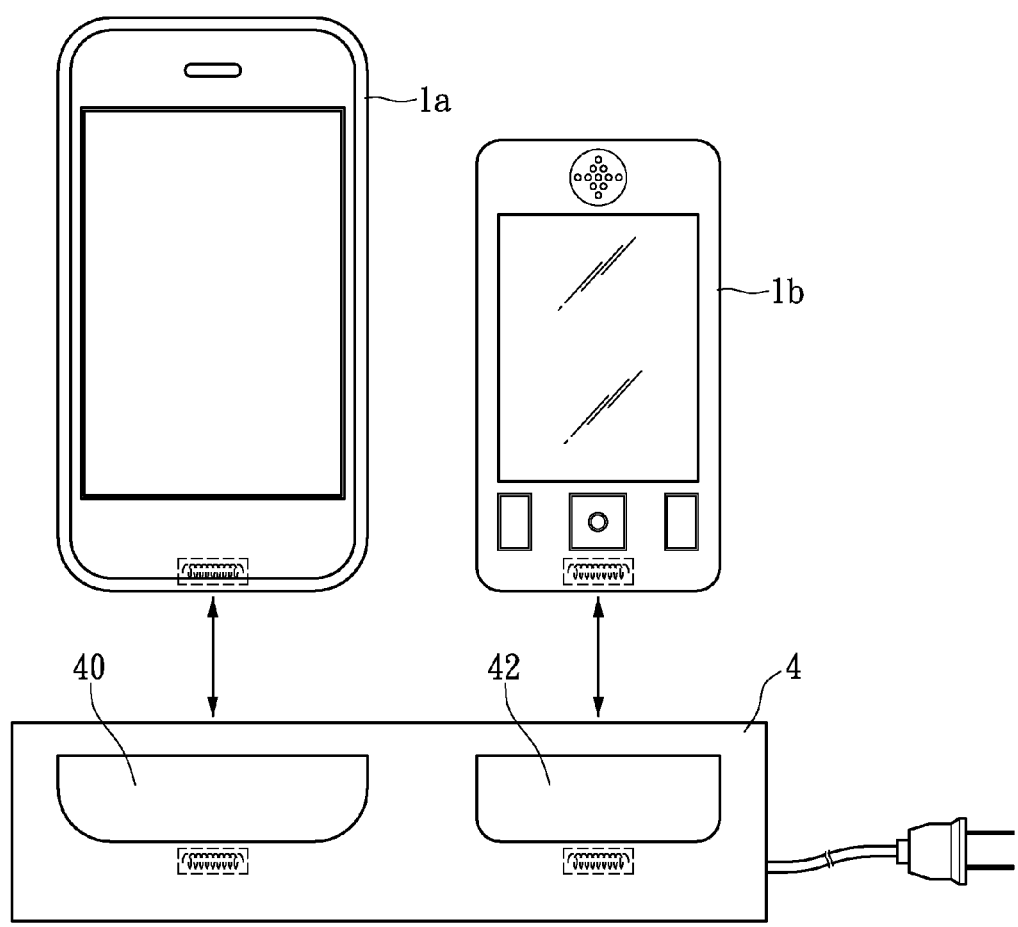
FIG. 4 shows a schematic diagram of an electromagnetic induction device according to another one embodiment of the present invention.

In conjunction with FIG. 2, FIG. 4 shows a schematic diagram of an electromagnetic induction device according to another one embodiment of the present invention. Comparing with the electromagnetic induction device 2, an electromagnetic induction device 4 in FIG. 4 includes a plurality of containing vessels 40 and 42 so that the wireless charging mobile communication devices of different types/sizes/configurations may be accommodated within the containing vessels 40 and 42, rendering possible that more than one wireless charging mobile communication device may be in operation at the same time In summary, the antenna module utilized by the wireless charging mobile communication device of the present invention may receive and transmit the wireless signals and also electromagnetically induct with the electromagnetic induction device to generate a current for the purpose of charging.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A wireless charging mobile communication device, comprising:
    a wireless communication module, for processing wireless signals;
    an electricity storage module;
    an antenna module, receiving and transmitting the wireless signals, or electromagnetically inducting a current;
    a converting module, directly coupled to the electricity storage module, wherein the converting module converts the electromagnetically induced current for facilitating a charging of the electricity storage module; and
    a switching module, directly coupled to the antenna module, the wireless communication module, and the converting module, wherein the switching module is for connecting the antenna module with the wireless communication module or connecting the antenna module with the converting module,
    wherein the switching module is a mechanical switch or an electronic switch.

2. The wireless charging mobile communication device according to claim 1, wherein the electricity storage module is a secondary battery module.

3. The wireless charging mobile communication device according to claim 2, wherein the secondary battery module comprises a lead-acid battery, or a nickel-cadmium battery, or a nickel-metal-hydride battery, or a lithium-ion battery, or a lithium-iron battery or combinations thereof.

4. An antenna device integrated with capability of electricity charging, electrically coupled to a electricity storage module and a wireless communication module, comprising:
    an antenna module for receiving and transmitting wireless signals or electromagnetically inducting a current;
    an converting module, directly coupled to the electricity storage module, wherein the converting module converts the electromagnetically induced current for facilitating a charging of the electricity storage module; and
    a switching module, directly coupled to the antenna module, the switching module and the wireless communication module, wherein the switching module is for connecting the antenna module with the wireless communication module or connecting the antenna module with the converting module,
    wherein the switching module is a mechanical switch or an electronic switch.

5. A wireless charging system, comprising:
    a wireless charging mobile communication device, comprising:
        a wireless communication module;
        an electricity storage module;
        a converting module, directly coupled to the electricity storage module, wherein the converting module converts an electromagnetically induced current for facilitating a charging of the electricity storage module;
        an antenna module for receiving and transmitting wireless signals or electromagnetically inducing the electromagnetically induced current; and
        a switching module, directly coupled to the antenna module, the wireless communication module, and the converting module, wherein the switching module is for connecting the antenna module with the wireless communication module or connecting the antenna module with the converting module,
        wherein the switching module is a mechanical switch or an electronic switch; and
    an electromagnetic induction device, comprising:
        a containing vessel, for containing the wireless charging mobile communication device; and
        an active coil, electrically coupled to local distribution networks, for electromagnetically inducting with the antenna module of the wireless charging mobile communication device when the wireless charging mobile communication device is stored in the containing vessel.

6. The wireless charging system according to claim 5, wherein the wireless charging mobile communication device further comprises a monitoring and controlling module electrically coupled to the switching module for detecting whether or not the wireless charging mobile communication device is stored in the containing vessel.

7. The wireless charging system according to claim 6, wherein when the wireless charging mobile communication device is not stored in the containing vessel, the monitoring and control module controls the switching module to connect the antenna module with the wireless communication module, and when the wireless charging mobile communication device is stored in the containing vessel, the monitoring and control module controls the switching module to connect the antenna module with the converting module.

* * * * *